(12) United States Patent
Kobayakawa et al.

(10) Patent No.: US 10,760,031 B2
(45) Date of Patent: Sep. 1, 2020

(54) SLIDING RESIN COMPOSITION, AND SLIDING MEMBER

(71) Applicant: DAIDO METAL COMPANY LTD., Nagoya-shi, Aichi (JP)

(72) Inventors: Hiroki Kobayakawa, Inuyama (JP); Erina Yasuda, Inuyama (JP)

(73) Assignee: DAIDO METAL COMPANY LTD., Nagoya-Shi, Aichi (JP)

(*) Notice: Subject to any disclaimer, the term of this patent is extended or adjusted under 35 U.S.C. 154(b) by 0 days.

(21) Appl. No.: 15/311,262

(22) PCT Filed: May 15, 2015

(86) PCT No.: PCT/JP2015/064118
§ 371 (c)(1),
(2) Date: Nov. 15, 2016

(87) PCT Pub. No.: WO2015/174538
PCT Pub. Date: Nov. 19, 2015

(65) Prior Publication Data
US 2017/0088791 A1 Mar. 30, 2017

(30) Foreign Application Priority Data

May 15, 2014 (JP) ................................. 2014-101855

(51) Int. Cl.
*F16C 33/22* (2006.01)
*C10M 169/04* (2006.01)
(Continued)

(52) U.S. Cl.
CPC ............. *C10M 169/04* (2013.01); *C08K 3/08* (2013.01); *C08K 3/30* (2013.01); *C08K 3/34* (2013.01);
(Continued)

(58) Field of Classification Search
CPC ........ C10M 7/00; C10M 5/00; C10M 169/04; C10M 103/06; C10M 107/38;
(Continued)

(56) References Cited

U.S. PATENT DOCUMENTS 7,887,922 B2 2/2011 Mayston et al.
8,242,064 B2 8/2012 Kamiya et al.
(Continued)

FOREIGN PATENT DOCUMENTS

EP 1764522 A2 3/2007
JP 01261514 A 10/1989
(Continued)

OTHER PUBLICATIONS

International Search Report of PCT/JP2015/064118 dated Aug. 4, 2015.
(Continued)

*Primary Examiner* — Prem C Singh
*Assistant Examiner* — Francis C Campanell
(74) *Attorney, Agent, or Firm* — Browdy and Neimark, PLLC

(57) ABSTRACT

A resin composition for use in a sliding member, which has higher seizing resistance while maintaining abrasion resistance. The sliding resin composition includes: a resin binder; a solid lubricant; and a protecting and reinforcing agent that is harder and brittler than the resin binder. As the protecting and reinforcing agent, aggregates of particles harder than the resin binder are used. The amount of the protecting and reinforcing agent contained is 1 vol. % or more but 20 vol. % or less of the entire sliding resin composition. The particles harder than the resin binder have an average particle diameter of 10 nm or more but 100 nm or less that is smaller than that of the solid lubricant.

12 Claims, 3 Drawing Sheets

(51) Int. Cl.
*C09D 7/40* (2018.01)
*C09D 201/00* (2006.01)
*C08L 101/00* (2006.01)
*C08K 3/08* (2006.01)
*C08K 3/30* (2006.01)
*C08K 3/34* (2006.01)
*C08K 3/36* (2006.01)
*C08L 79/08* (2006.01)
*C10M 103/06* (2006.01)
*C10M 107/38* (2006.01)
*F16C 33/20* (2006.01)

(52) U.S. Cl.
CPC ............... *C08K 3/36* (2013.01); *C08L 79/08* (2013.01); *C08L 101/00* (2013.01); *C09D 7/67* (2018.01); *C09D 201/00* (2013.01); *C10M 103/06* (2013.01); *C10M 107/38* (2013.01); *F16C 33/201* (2013.01); *C08K 2003/0806* (2013.01); *C08K 2003/3009* (2013.01); *C08K 2201/016* (2013.01); *C10M 2201/0653* (2013.01); *C10M 2201/0663* (2013.01); *C10M 2213/0623* (2013.01); *F16C 2360/22* (2013.01)

(58) Field of Classification Search
CPC .. C10M 2201/0663; C10M 2213/0623; C10M 2201/0653; C10M 169/00; C10M 2201/102; F16C 33/201; F16C 33/20; C09D 201/00; C09D 7/67; C09D 7/40; C08L 101/00; C08L 79/08; C08K 3/30; C08K 2201/016; C08K 2003/0806; C08K 2003/3009; C08K 3/00; C01N 2020/06; C01N 2050/02
USPC .................................................. 508/104, 110
See application file for complete search history.

(56) References Cited

U.S. PATENT DOCUMENTS

| | | | |
|---|---|---|---|
| 2007/0065067 | A1 | 3/2007 | Gartner et al. |
| 2007/0297704 | A1 | 12/2007 | Mayston et al. |
| 2008/0070815 | A1* | 3/2008 | Kamada ............... C10M 169/04 508/107 |
| 2010/0144564 | A1 | 6/2010 | Kamiya et al. |
| 2013/0116157 | A1* | 5/2013 | Mukai ................... C08G 73/10 508/108 |
| 2014/0233875 | A1 | 8/2014 | Kobayakawa et al. |

FOREIGN PATENT DOCUMENTS

| | | | |
|---|---|---|---|
| JP | 07166182 | A | 6/1995 |
| JP | 08-034913 | A | 2/1996 |
| JP | 08059991 | A | 3/1996 |
| JP | 10-046107 | A | 2/1998 |
| JP | 10037962 | A | 2/1998 |
| JP | 3017626 | | 3/2000 |
| JP | 2002053883 | A | 2/2002 |
| JP | 2003306604 | A | 10/2003 |
| JP | 2004323789 | A | 11/2004 |
| JP | 2006-037044 | A | 2/2006 |
| JP | 2006116458 | A | 5/2006 |
| JP | 2007092995 | A | 4/2007 |
| JP | 2007517165 | A | 6/2007 |
| JP | 200895725 | A | 4/2008 |
| JP | 2010121123 | A | 6/2010 |
| JP | 201372535 | A | 4/2013 |
| WO | 2015020020 | A1 | 2/2015 |

OTHER PUBLICATIONS

Written Opinion of International Searching Authority of PCT/JP2015/064118 dated Aug. 4, 2015.

* cited by examiner

SLIDING RESIN COMPOSITION, AND SLIDING MEMBER

TECHNICAL FIELD

The present invention relates to a sliding resin composition and improvement of a sliding member using the composition.

BACKGROUND ART

The sliding surface of a bearing applied to the engine of a vehicle is required to have high abrasion resistance and seizing resistance. As one of solutions to this requirement, a technique has been proposed in which the sliding surface of a bearing is coated with a resin composition (see Patent Documents 1 and 2).

In this technique disclosed in these prior art literatures, a layer of a resin composition is formed by coating the inner peripheral surface (sliding surface) of a semi-cylindrical base material layer with the resin composition.

Such a sliding resin composition (hereinafter, sometimes simply referred to as "resin composition") contains a resin binder, a solid lubricant, and protecting and reinforcing particles. When a load is applied to the resin composition, the solid lubricant itself is deformed (e.g., cleaved), more specifically, slip occurs between its crystal planes so that the stress of the resin composition is relaxed (Patent Document 1). On the other hand, for example, nano-ordered silica particles (20 to 50 nm in diameter) are used as the protecting and reinforcing particles to improve the abrasion resistance of the entire resin composition (Patent Document 2).

Refer to Patent Documents 3 to 5 as other prior art literatures that disclose techniques relating to the present invention.

CITATIONS LIST

Patent Document 1: JP 2013-72535 A
Patent Document 2: JP 2007-517165 A
Patent Document 3: JP 2006-116458 A
Patent Document 4: JP 2007-92995 A
Patent Document 5: JP 2008-95725 A

SUMMARY OF INVENTION

Technical Problems

Current car engines tend to frequently repeat start and stop to improve fuel efficiency. Further, the viscosity of engine oil has been reduced to reduce the shear resistance of the oil. In the case of such an engine, an oil film between a shaft and a bearing tends to be insufficient so that sliding under boundary lubrication conditions often occurs. As a result, the friction coefficient during sliding increases so that a load applied to a resin composition layer that is in contact with the shaft in the bearing increases.

When a load applied to the resin composition layer increases, there is a possibility that the resin composition layer is deformed beyond its limitation so that a resin composition itself is broken or a resin composition is separated from a base material. As a result, solid contact occurs between the base material (alloy layer) of the bearing and the shaft so that welding occurs between the base material of the bearing and the shaft due to excessive heat generation, which may cause seizing.

The techniques disclosed in Patent Documents 1 and 2 are intended to improve the resin composition layer to improve seizing resistance.

However, the resin composition layer of the bearing is required to have higher seizing resistance for the following reasons.

In recent years, diesel engines for heavy trucks and the like as well as gasoline engines have been required to frequently repeat start and stop to achieve lower fuel consumption. As compared to a bearing for gasoline engine, a heavier specific load is applied to a bearing for diesel engine at a lower peripheral speed, which makes it more difficult to maintain an oil film between a shaft and the bearing. Further, a vehicle with a diesel engine generally travels a longer distance between maintenances than a vehicle with a gasoline engine, which increases the possibility of entry of foreign dirt into between a shaft and a bearing. This also makes it difficult to maintain an oil film. Further, a cast iron shaft having a rougher surface than a conventional one has used to reduce the cost of the shaft, which also makes it difficult to maintain an oil film.

A heavy load is applied to a bearing for diesel engine, and therefore a resin composition constituting the sliding surface of the bearing is, of course, required to have high abrasion resistance.

Solutions to Problems

In order to solve such a problem, it is an object of the present invention to improve the seizing resistance of a resin composition for use in, for example, a bearing for a vehicle engine while maintaining the abrasion resistance of the resin composition.

In order to achieve the above object, a first aspect of the present invention provides a sliding resin composition, including:
a resin binder;
a solid lubricant; and
a protecting and reinforcing agent that is harder and brittler than the resin binder.

The thus defined sliding resin composition according to the first aspect contains the protecting and reinforcing agent harder than the resin binder, which allows the entire sliding resin composition to have high abrasion resistance.

Further, when a load that is too heavy to be absorbed by deformation of the solid lubricant is applied to the resin composition, this load is applied also to the protecting and reinforcing agent. The protecting and reinforcing agent is brittler than the resin binder, and therefore, the protecting and reinforcing agent is deformed or disintegrated before the resin binder is deformed. Therefore, the stress of the resin binder is relaxed, and as a result, it is possible to prevent the resin binder, which can be said to be the skeleton of the sliding resin composition, from being significantly broken at once.

As described above, when the sliding surface of a bearing is made of such a sliding resin composition, since the resin composition has improved durability, direct contact between a shaft and the bearing is prevented so that seizing resistance is improved.

The hardness of each component serves as an indicator of abrasion resistance, and can be expressed as, for example, Vickers hardness.

The hardness of the protecting and reinforcing agent is 10 to 100 times higher than that of the resin binder in terms of Vickers hardness.

Further, the brittleness of each component can be expressed by the threshold stress of the each component. The threshold stress refers to the maximum stress that, when a load is applied to each component of the resin composition, each component can withstand without plastic deformation or breakage. When having a smaller threshold stress, each component is more easily disintegrated and is brittler.

The solid lubricant contained in the resin composition reduces the friction coefficient of the surface of the resin composition to improve the slip properties thereof. In general, molybdenum disulfide, tungsten disulfide, boron nitride, graphite, or the like is used as the solid lubricant. All these materials are softer (smaller hardness) and brittler (smaller threshold stress) than the resin binder.

According to a second aspect of the present invention, the threshold stress of each of the three components constituting the resin composition, that is, the resin binder, the solid lubricant, and the protecting and reinforcing agent is defined as follows.

Solid lubricant≤Protecting and reinforcing agent<Resin binder

As for the thus defined resin composition according to the second aspect, when a heavy load is applied to the resin composition, the solid lubricant and the protecting and reinforcing agent are deformed or disintegrated before the resin binder is deformed because the solid lubricant and the protecting and reinforcing agent are brittler than the resin binder. Therefore, the stress of the resin binder is relaxed, and as a result, the shape of the resin binder, which can be said to be the skeleton of the sliding resin composition, is maintained.

The protecting and reinforcing agent that is harder and brittler than the resin binder is as follows. One example of the protecting and reinforcing agent is obtained by aggregating particles made of a harder material than a forming material of the resin binder (in this description, sometimes referred to as "protecting and reinforcing primary particles").

It is considered that the protecting and reinforcing primary particles are aggregated in a manner that high-order particles (secondary or higher particles) are formed by, for example, directly coupling single particles (i.e., primary particles) to form secondary particles and further coupling the secondary particles to form tertiary particles, or in a manner that primary particles are coupled by the resin binder, or in a manner that coupling of primary particles is supported by the resin binder. In this description, particles obtained by aggregating the protecting and reinforcing primary particles are sometimes referred to as "aggregates".

When a load is applied to the aggregates, the aggregates are deformed due to the occurrence of slip between the particles before the resin binder is deformed, and finally the aggregates are disintegrated. In other words, when a load applied to the resin composition exceeds the threshold stress of the aggregates, slip irreversibly occurs between the particles constituting the aggregates, and when the slip further increases, the aggregates themselves are disintegrated so that some of the particles coupled to form the aggregates are detached. The threshold stress of the aggregates is set to be smaller than that of the resin binder, which makes it possible to relax the stress of the resin binder.

When a load exceeding the threshold stress of the aggregates is applied, some of the aggregates exposed at the sliding surface of the resin composition are partially disintegrated and detached so that minute recesses are formed in the sliding surface. The recesses serve as lubricant oil retaining parts that contribute to maintaining an oil film on the sliding surface.

When particles formed to have a balloon shape using a harder material than the forming material of the resin binder are used as the protecting and reinforcing primary particles, the brittleness of such balloon particles themselves can be controlled by controlling at least one of the particle diameter, shape, wall thickness, and forming material of the balloon particles. Therefore, such balloon-shaped protecting and reinforcing primary particles themselves can have the property of being harder and brittler than the resin binder. Therefore, when the balloon-shaped protecting and reinforcing primary particles are used, they may or may not be aggregated to form aggregates.

As the forming material of the balloon-shaped protecting and reinforcing primary particles, a metal oxide such as silica or titanium oxide or a resin material harder than the forming material of the resin binder can be used.

The amount of the protecting and reinforcing agent contained in the resin composition is 1 vol. % or more but 20 vol. % or less of the entire resin composition. When the amount of the protecting and reinforcing agent contained is 1 vol. % or more of the entire resin composition, the amount of the aggregates exposed at the sliding surface is sufficient so that lubricant oil retaining parts can be sufficiently formed. When the particles are harder than the resin binder to improve the abrasion resistance of the resin composition, the abrasion resistance of the resin composition can be sufficiently improved. On the other hand, when the amount of the particles contained is 20 vol. % or less of the entire resin composition, the viscosity of the resin binder is suitable for production.

The protecting and reinforcing primary particles to be aggregated have a smaller diameter than the solid lubricant. Here, the diameter of the protecting and reinforcing primary particles and the diameter of the solid lubricant refer to diameters in a measured view, and the diameters of all the protecting and reinforcing primary particles are substantially smaller than the diameters of all the particles of the solid lubricant. If the diameter of the protecting and reinforcing primary particles is larger than that of the solid lubricant, the aggregates thereof may have a larger diameter, and therefore it may inhibit the function of the solid lubricant.

Based on the above, a fifth aspect of the present invention is defined as follows. That is, in the sliding resin composition according to the first aspect, the protecting and reinforcing agent includes aggregates of particles that are harder than the resin binder and have a smaller diameter than the solid lubricant, and occupies 1 vol. % or more but 20 vol. % or less of the entire sliding resin composition.

It is to be noted that the amount of the protecting and reinforcing agent contained (vol. %=volume %) can be determined not only by comparison of the volumes of raw materials but also by ICP chemical analysis of a bulk of the resin composition.

A sixth aspect of the present invention is defined as follows. That is, in the resin composition according to the fifth aspect, the particles have an average particle diameter of 10 nm or more but 100 nm or less.

As for the thus defined resin composition according to the sixth aspect, when the protecting and reinforcing primary particles having an average particle diameter of 10 nm or more but 100 nm or less are used, the single particles (i.e., primary particles) are easily aggregated together in the resin composition.

The particle diameter of the primary particles can be defined, for example, as follows. The primary particles appearing in the cross-section of the sliding resin composition perpendicular to the sliding surface of the sliding resin composition are approximated by ellipses, and the long axis of the ellipses is defined as a particle diameter.

When the amount of the protecting and reinforcing agent is set to a value within the above range and the average particle diameter of the primary particles is set to 10 nm or more, it is possible to prevent excessive aggregation of the protecting and reinforcing primary particles contained in the resin composition. If the average particle diameter is less than 10 nm, excessive aggregation of the protecting and reinforcing primary particles occurs so that an area where the protecting and reinforcing agent is absent increases in the resin composition, and therefore the resin composition may not be sufficiently improved by the protecting and reinforcing agent.

Further, when the amount of the protecting and reinforcing agent contained is set to a value within the above range and the average particle diameter of the protecting and reinforcing primary particles is set to 100 nm or less, appropriate aggregates can be reliably formed without excessive dispersion of the protecting and reinforcing primary particles. If the average particle diameter exceeds 100 nm, the protecting and reinforcing primary particles may be excessively dispersed singly in the resin composition. In this case, it also may cause that the protecting and reinforcing agent cannot sufficiently perform its function of preventing the breakage of the resin composition by deformation or disintegration of the aggregates of the protecting and reinforcing primary particles.

When the aggregates of the protecting and reinforcing primary particles are appropriately deformed or disintegrated, accumulation of stress in the resin binder can be efficiently prevented, and therefore the resin binder is not significantly broken at once. As a result, the seizing resistance of the resin composition is improved.

From another viewpoint, the average particle diameter of the protecting and reinforcing primary particles that should be aggregated to form aggregates may be 15 nm or more but 50 nm or less.

A seventh aspect of the present invention is defined as follows.

In the sliding resin composition according to the sixth aspect, when the average particle diameter of the aggregates of the protecting and reinforcing primary particles is defined as A and a standard deviation of the average particle diameter is defined as $\sigma$, A$-1\sigma$ is 60 nm or more and A$+1\sigma$ is 400 nm or less.

The shape of the aggregates is not limited to a sphere. Therefore, in this description, the diameter of the aggregates appearing in a measured view in a cutting surface obtained by cutting the sliding resin composition in a direction perpendicular to the sliding surface of the sliding resin composition is used. More specifically, the aggregates observed are approximated by ellipses, and the long axis of the ellipses is defined as the diameter of the aggregates. A heavier load is applied to the sliding resin composition in a direction perpendicular to the sliding surface of the sliding resin composition. This is the reason why the cutting surface perpendicular to the sliding surface is defined as a measured view. Further, the width of the aggregates subjected to a load in the perpendicular direction (=the length of the aggregates projected onto the sliding surface) significantly relates to the threshold stress of the aggregates. This is the reason why the long axis of approximate ellipses of the aggregates is defined as the diameter of the aggregates.

As for the thus defined sliding resin composition according to the seventh aspect, the aggregates have an appropriate size. Therefore, the protecting function of the aggregates themselves is ensured so that, when a load is applied, the aggregates are deformed or disintegrated prior to the resin composition, and dispersibility is ensured so that the aggregates are evenly dispersed in the resin composition.

On the other hand, when the value of A$-1\sigma$ is 60 nm or more, the degree of aggregation of the particles in the resin composition is sufficient. Therefore, the threshold stress resulting from slip between the particles is smaller than that of the resin binder. When the value of A$+1\sigma$ is 400 nm or less, the degree of dispersion of the aggregates of the particles is sufficient, and therefore there is no region where the protecting and reinforcing agent is unevenly distributed in the resin composition.

An eighth aspect of the present invention is defined as follows. That is, in the sliding resin composition according to any one of the third to seventh aspects, an angle between a long axis of the aggregates and a sliding surface is 45 degrees or less.

Here, the long axis of the aggregates is defined in the same manner as the diameter of the aggregates described in the seventh aspect. That is, the long axis of the aggregates refers to the long axis of the aggregates appearing in a measured view in a cutting surface obtained by cutting the sliding resin composition in a direction perpendicular to the sliding surface of the sliding resin composition. For example, the observed aggregates are approximated by ellipses, and the long axis of the ellipses is defined as the long axis of the aggregates.

It is to be noted that the angles of long axes of all the aggregates are not the same, and therefore the average of the angles of long axes of the aggregates observed in the cutting surface is set to 45 degrees or less.

From another viewpoint, the angle between the long axis of the aggregates and the sliding surface is set to 5 degrees or more but 45 degrees or less. If the angle is less than 5 degrees, it also may cause that when the aspect ratio of the aggregates is relatively large, the aggregates cannot sufficiently exert their stress relaxation function on a load applied in a direction parallel to the sliding surface. Further, when the angle is less than 5 degrees, that is, when the aggregates lie flat, the aggregates may be concentrated in the vicinity of the surface of the sliding resin composition, and therefore the resin composition has non-uniform properties.

When the angle between the long axis of the aggregates and the sliding surface is 45 degrees or less, in other words, when the long axis of the aggregates is nearly parallel to the sliding surface, the aggregates reliably receive a load applied in a direction perpendicular to the sliding surface, and the load acts as a shearing force in a short axis direction so that the aggregates are more reliably deformed or disintegrated.

Further, when the long axis of the aggregates is nearly parallel to the sliding surface, the sliding body is more largely exposed at the sliding surface. This makes it easy to partially detach the exposed sliding body to form micro recesses that serve as lubricant oil retaining parts.

On the other hand, if the angle between the long axis of the aggregates and the sliding surface exceeds 45 degrees, it also may cause that areas in the aggregates where a load applied in a direction perpendicular to the sliding surface is received are narrow, which makes it difficult to deform or disintegrate the aggregates. Further, if the angle exceeds 45 degrees, the area of the sliding body exposed at the sliding surface may be small, which makes it difficult to form recesses that serve as lubricant oil retaining parts.

DESCRIPTION OF EMBODIMENTS

Figure 1:
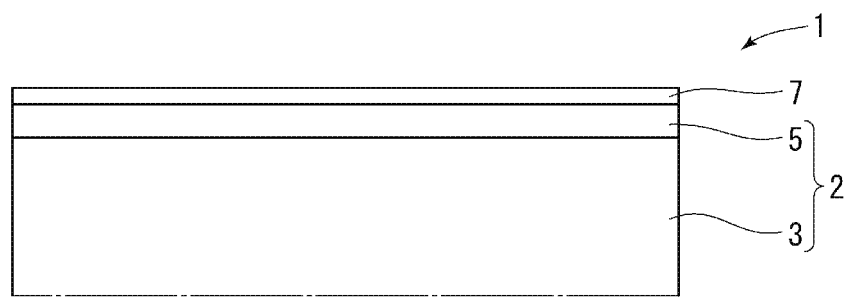
FIG. 1 is a schematic view showing the structure of a sliding member according to an embodiment of the present invention.
Figure 2:
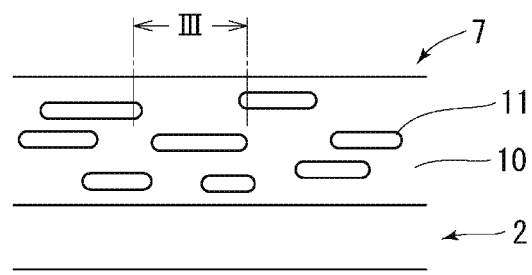
FIG. 2 is a partially-enlarged view showing the structure of a resin coating layer.

FIG. 1 shows a layered structure of a sliding member 1 according to an embodiment of the present invention.

This sliding member 1 has a structure in which a resin coating layer 7 including a sliding resin composition is laminated on a base material layer 2.

In the sliding member 1 including a cylindrical or semi-cylindrical bearing, the base material layer 2 thereof includes a cylindrical or semi-cylindrical steel plate layer 3. If necessary, an alloy layer 5 made of an alloy of Al, Cu, Sn, or the like is provided on the surface (inner peripheral surface) of the steel plate layer 3. Although not shown, the base material layer 2 may be one having, on the surface of the alloy layer 5, a Sn-, Bi-, or Pb-group plating layer or a layer having a resin. The layer having a resin is different from the resin coating layer 7.

In order to improve adhesion between the base material layer 2 and the resin coating layer 7, the inner peripheral surface of the base material layer 2 may be subjected to surface roughening. The surface roughening may be performed by chemical surface treatment such as combination of alkaline etching and pickling or mechanical surface treatment such as shot blasting.

The constituent material of the steel plate layer 3 is not limited to steel, and may be, for example, an alloy of aluminum, copper, and tungsten.

The sliding resin composition constituting the resin coating layer 7 includes a resin binder 10, a solid lubricant 11, and aggregates 20 of protecting and reinforcing primary particles 13.

In the resin composition, the resin binder 10 binds the resin coating layer 7 to the base material layer 2 and fixes the solid lubricant 11. A resin material used for the resin binder 10 may be appropriately selected depending on, for example, the intended use of the sliding member 1. When the sliding member 1 is used for vehicle engines, the resin material may be at least one of polyimide resins, polyamideimide resins, epoxy resins, phenol resins, polyamide resins, fluorine resins, and elastomers, and may be a polymer alloy.

The thickness of the resin coating layer 7 may be arbitrarily designed, and may be, for example, 1 µm or more but 20 µm or less.

A method for laminating the resin coating layer 7 may also be arbitrarily selected. Examples of the method to be used include pad printing, screen printing, air spray painting, airless spray painting, electrostatic painting, tumbling, squeezing, rolling, and roll coating.

The material of the solid lubricant 11 may also be appropriately selected depending on the intended use of the sliding member. For example, the material of the solid lubricant 11 may be at least one selected from molybdenum disulfide, tungsten disulfide, h-boron nitride, polytetrafluoroethylene, melamine cyanurate, carbon fluoride, phthalocyanine, graphene nanoplatelets, fullerene, ultrahigh molecular weight polyethylene (manufactured by Mitsui Chemicals, Inc. under the trade name of "MIPELON"), and Nε-lauroyl-L-lysine (manufactured by Ajinomoto Co., Inc. under the trade name of "AMIHOPE").

The amount of the solid lubricant 11 contained in the resin composition may be arbitrarily selected depending on the intended use of the sliding member. For example, when the amount of the entire resin composition constituting the resin coating layer 7 is defined as 100 vol. %, the amount of the solid lubricant 11 contained in the resin composition may be 20 vol. % or more but 70 vol. % or less.

In order to improve the slip properties of the resin coating layer 7, the (0, 0, L) plane orientation intensity ratio of the solid lubricant 11 is preferably 75% or more.

Figure 3:
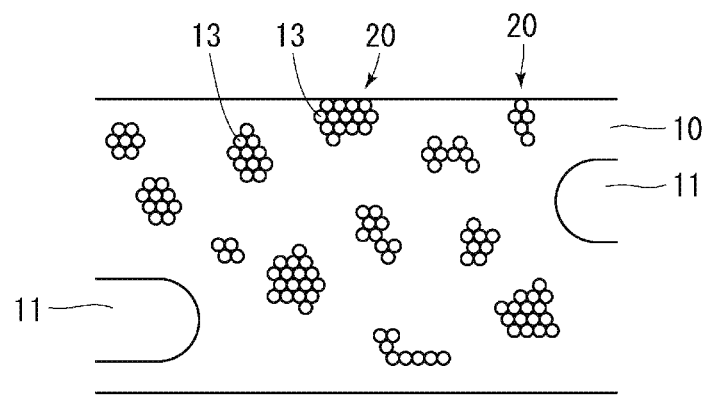
FIG. 3 is an enlarged view of a portion indicated by an arrowed line III in FIG. 2.

As shown in FIG. 3, the protecting and reinforcing primary particles 13 are provided in the sliding resin composition constituting the resin coating layer 7, and the protecting and reinforcing primary particles 13 are aggregated together to form aggregates 20 as a protecting and reinforcing agent.

The abrasion resistance of the resin coating layer 7 itself is improved by using, as the protecting and reinforcing primary particles 13, ultrafine particles that are harder than the material of the resin binder 10 and have a smaller diameter than the solid lubricant 11, preferably, a nano-order diameter (see Patent Document 2).

In order to directly achieve such a purpose, the protecting and reinforcing primary particles 13 are preferably dispersed more evenly in the resin coating layer. More specifically, it is preferred that the protecting and reinforcing primary particles 13 be dispersed without coupling together as much as possible, that is, the protecting and reinforcing primary particles 13 be dispersed as primary particles.

Figure 4A:
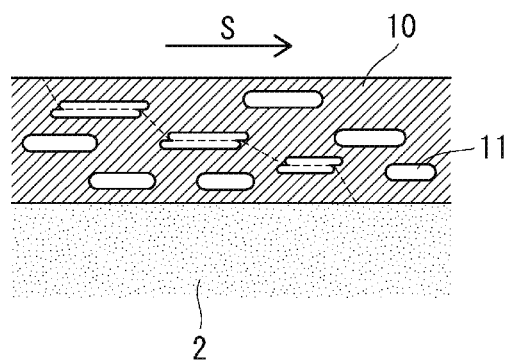
FIG. 4 is a schematic view illustrating the separation and breakage of a resin binder when aggregates of protecting and reinforcing particles are absent in a resin composition.
Figure 4B:
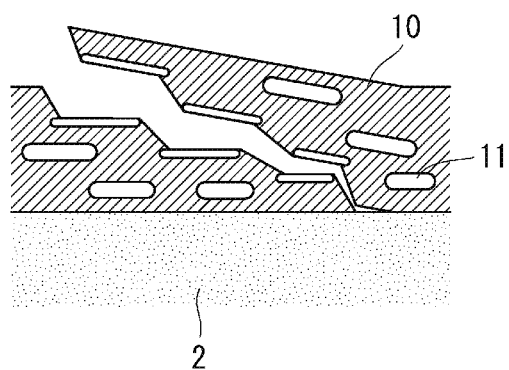

However, as a result of study by the present inventors, when a heavy load is applied to the resin coating layer 7, as shown in FIG. 4, the resin binder 10 may be deformed beyond its limitation and significantly broken at once. FIGS. 4A and 4B schematically show a situation in which the resin coating layer 7 is separated from the base material layer 2 due to the breakage of the resin binder 10.

On the other hand, according to this invention, as shown in FIG. 3, the protecting and reinforcing primary particles 13 are allowed to be intentionally aggregated to form the aggregates 20. The protecting and reinforcing primary particles 13 constituting the aggregates 20 can be described, from the viewpoint of stress applied to the resin coating layer 7, that the aggregates 20 are not affected at all even when the stress at which deformation of the solid lubricant starts is applied (i.e., the aggregates 20 are not deformed), but are deformed or disintegrated before the start of deformation of the resin binder 10 beyond the threshold stress of the resin binder 10.

Therefore, when a heavy load is applied to the resin coating layer 7, part of stress generated in the resin coating layer 7 is relaxed by deformation or disintegration of the aggregates 20, which prevents the resin coating layer 7 from being significantly broken at once.

Figure 5A:
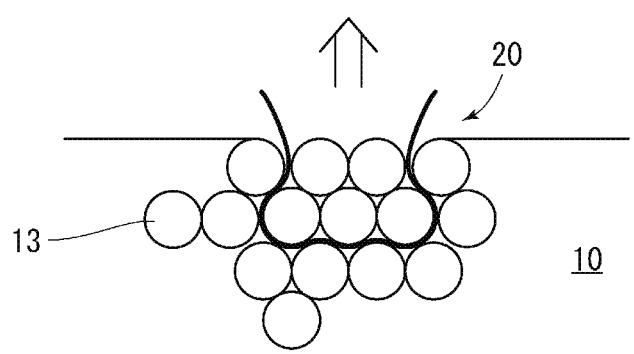
FIG. 5 is a schematic view illustrating partial detachment of aggregates of protecting and reinforcing particles caused by applying the threshold stress of the aggregates to the aggregates.
Figure 5B:
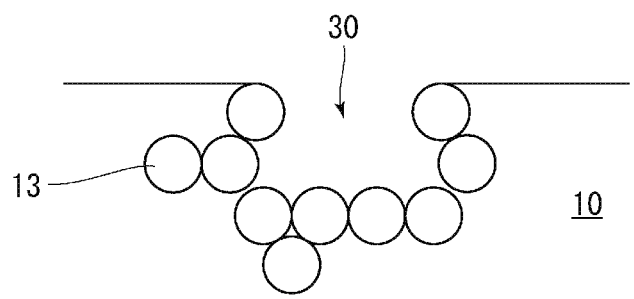

At this time, as shown in FIG. 5, when the aggregates 20 are exposed at the sliding surface, some of the protecting and reinforcing primary particles 13 constituting the aggregates 20 are detached. As a result, as shown in FIG. 5B, recesses (micro pods) 30 are formed in the aggregates 20. The recesses 30 can hold lubricant oil supplied to the sliding surface of the sliding member 1. Also from this viewpoint, the aggregates 20 contribute to maintaining an oil film on the sliding surface of the sliding member 1.

From the viewpoint of improving the abrasion resistance of the resin coating layer 7 itself, the constituent material of the protecting and reinforcing primary particles 13 is harder than the resin binder 10 and has a smaller diameter than the solid lubricant. The constituent material of the protecting and reinforcing primary particles 13 may be arbitrarily selected depending on the intended use of the sliding member, and more specifically, may be, for example, microparticles of gold, silver, silicon oxide (silica), aluminum oxide, zinc oxide, tin oxide, or zirconium oxide.

The protecting and reinforcing primary particles 13 may have an average particle diameter of 10 nm or more but 100 nm or less.

The average particle diameter of the protecting and reinforcing primary particles 13 can, of course, be determined from the specifications of raw material particles, but can also be determined in the following manner even in a state where the protecting and reinforcing primary particles 13 are contained in the resin coating layer 7. More specifically, for example, the resin coating layer is cut in an axial direction perpendicular to the sliding surface of the resin coating layer to obtain a cutting surface, and an image of a predetermined range of any portion in the cutting surface of the resin coating layer (hereinafter, sometimes referred to as "axial-direction cutting surface") is taken. The thus obtained image is analyzed by image analysis software to approximate the primary particles in the image by ellipses (particle-equivalent ellipses). In this analysis software, an ellipse having the same area and primary and secondary moments as those of a target object (primary particle) is defined as the particle-equivalent ellipse.

Such protecting and reinforcing primary particles can be formed by, for example, a crushing method using a ball mill, a jet mill, or the like, an aggregation method (reductive method) including aggregation caused by reduction using a reducing agent or by electrochemical reduction, a pyrolysis method including thermal decomposition, a physical vapor deposition method such as evaporation in plasma gas, a laser vaporization method including rapid laser vaporization, or a chemical vapor deposition method including a chemical reaction in a vapor phase. A reaction field for production of the protecting and reinforcing primary particles may be either a gas phase or a liquid phase.

When the amount of the entire resin composition constituting the resin coating layer 7 is defined as 100 vol. %, the amount of the protecting and reinforcing primary particles 13 contained in the resin composition, that is, the amount of the aggregates 20 contained in the resin composition may be 1 vol. % or more but 20 vol. % or less.

This makes it possible to allow the resin composition to have sufficient abrasion resistance and to control the viscosity of the resin composition to be suitable for production.

When the average particle diameter of the obtained aggregates is defined as A and the standard deviation of the average particle diameter is defined as $\sigma$, A$-1\sigma$ is 60 nm or more and A$+1\sigma$ is 400 nm or less.

The average particle diameter of the aggregates can be determined by the same method as used for the protecting and reinforcing primary particles.

The size of the aggregates can be adjusted by appropriately adjusting the method of surface treatment of the protecting and reinforcing primary particles and the degree of surface treatment, the type of dispersion medium for dispersing the protecting and reinforcing primary particles and the viscosity of the dispersion medium, and the concentration of the primary particles in the dispersion medium, and further homogenizing this dispersion system.

The angle between the long axis of the aggregates 20 and the surface (sliding surface) of the resin coating layer 7 is set to 45 degrees or less. The long axis of the aggregates 20 can be determined by the same method as used for the protecting and reinforcing primary particles.

The angle between the aggregates 20 and the surface of the resin coating layer 7 is adjusted by controlling the viscosity of a raw material of the resin coating layer 7 (containing a solvent added to improve flowability) and the time elapsed until the raw material is cured to form the resin coating layer 7.

At first, the orientations of long axes of the aggregates contained in the resin composition having high flowability are random, but the aggregates are rotated due to the influence of gravity with time so that the long axes thereof are parallel to the sliding surface (hereinafter, sometimes referred to as "leveling"). This rotation progresses with time, and the progression is accelerated when the viscosity of the raw material is lower.

Figure 6:
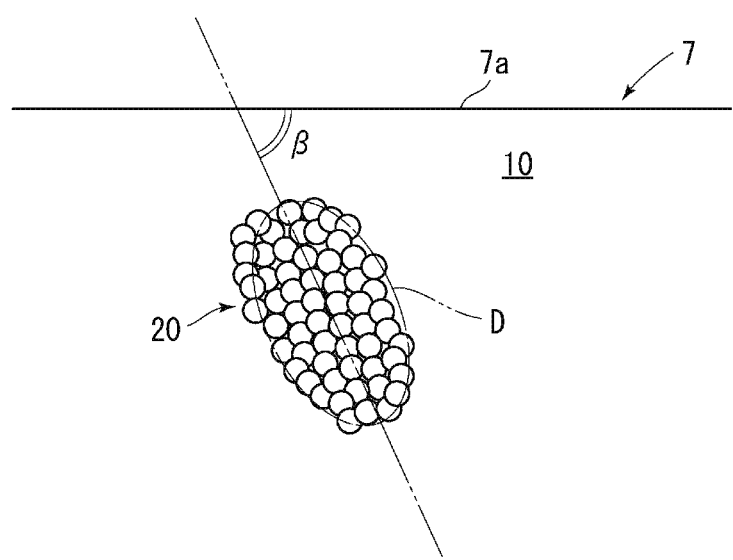
FIG. 6 is a schematic view illustrating an angle between a long axis of the aggregates of the protecting and reinforcing particles and a sliding surface of the resin composition.

FIG. 6 is a schematic view showing an angle between the long axis of the aggregate 20 and a sliding surface 7a of the resin coating layer 7. In FIG. 6, a virtual ellipse D of the aggregate 20 is indicated by an alternate long and short dashed line, and the long axis thereof is indicated by an arrow. The angle $\beta$ between the long axis and the sliding surface 7a is set to 45 degrees or less.

From the viewpoint of improving the abrasion resistance of the resin composition constituting the resin coating layer 7, hard particles that form substantially no aggregates may be added to the resin composition.

Such hard particles preferably have a size larger than 100 nm Examples of the material of the hard particles include oxides such as aluminum oxide, chromium oxide, cerium oxide, zirconium oxide, titanium oxide, silicon oxide, and magnesium oxide, nitrides such as silicon nitride and cubic boron nitride, carbides such as silicon carbide, and diamond. When the amount of the entire resin composition constituting the resin coating layer 7 is defined as 100 vol. %, the amount of the hard particles contained in the resin composition may be 1 vol. % or more but 5 vol. % or less. When the material of the hard particles is different from that of the protecting and reinforcing primary particles, the properties of the resin coating layer 7 can be easily controlled. When the hard particles are made of the same material as the protecting and reinforcing primary particles, the sliding member can be inexpensively produced.

When the amount of the entire resin composition is defined as 100 vol. %, metal particles of Sn, Bi, Pb, In, or the like may be added in an amount of 1 vol. % or more but 5 vol. % or less.

Hereinbelow, a method for producing the sliding member 1 will be described.

In this embodiment, a solution obtained by dissolving the resin binder in a solvent and a solution obtained by dispersing the aggregates in the solvent are mixed together, and the resulting mixture is mixed with the solid lubricant and an additive used depending on the intended use to prepare a coating liquid. If necessary, the amount of the solvent is controlled to adjust the viscosity of the coating liquid to be within a preferred range. Then, the coating liquid is applied onto the base material layer 2. Then, the coating liquid is allowed to stand for a predetermined time (leveling step) so that the angle between the long axis of the aggregates and the sliding surface is 45 degrees or less, and is then subjected to a drying step to remove the solvent therefrom by heating so as to be cured to form the resin coating layer 7 including the sliding resin composition.

EXAMPLES

Hereinbelow, the present invention will be described with reference to the following examples suitable for a semi-cylindrical sliding member.

An aluminum bearing alloy layer was pressure-welded to the surface of a back metal layer formed from a semi-cylindrical steel member. Finishing for bearing inner surface is performed on the inner peripheral surface of the alloy layer, and then degreasing and removal of foreign dirt were performed.

Then, surface roughening treatment was performed by shot blasting.

Onto the inner peripheral surface of this intermediate, a previously-prepared coating liquid was applied by spraying so as to have a thickness of about 5 μm. Then, the coating liquid was subjected to a leveling step for a predetermined time and a drying step, and was then subjected to a curing step at 200° C. to 300° C. for 30 min to 120 min. In this way, a sliding member (bearing) was produced which had a resin coating layer 7 including a resin composition of each of Examples and Comparative Examples shown in Table 1.

The thus obtained sliding members (bearings) were subjected to a seizing test under the following conditions.
Rotation speed: 1500 rpm
Lubricant oil: VG22
Oil supply rate: 150 mL/min
Material of shaft: S55C A specific load was increased step by step to determine a specific load for seizing.

The results are shown in Table 1.

TABLE 1

| | | Resin binder | | Solid lubricant | | Protecting and reinforcing agent (aggregates) | | | Size of aggregates | | Tilt angle of aggregates | Specific load for seizing |
|---|---|---|---|---|---|---|---|---|---|---|---|---|
| | | | Content | | Content | | Content | Primary particle | | | | |
| | | Type | vol % | Type | vol % | Type | vol % | diameter nm | A − 1σ | A + 1σ | (°) | (MPa) |
| V | Example 1 | PAI | balance | MoS₂ | 40 | SiO₂ | 10 | 15 | 134.9 | 301.7 | 15 | 65.0 |
| | Example 2 | PAI | balance | MoS₂ | 30 | SiO₂ | 10 | 50 | 175.1 | 382.1 | 7 | 65.0 |
| | Example 3 | PAI | balance | MoS₂ | 40 | SiO₂ | 20 | 50 | 201.4 | 398.6 | 44 | 65.0 |
| | Example 4 | PAI | balance | MoS₂ | 30 | SiO₂ | 1 | 15 | 62.1 | 181.2 | 21 | 65.0 |
| IV | Example 5 | PAI | balance | MoS₂ | 31 | SiO₂ | 1 | 15 | 63 | 180 | 55 | 62.5 |
| III | Example 6 | PAI | balance | MoS₂ | 40 | SiO₂ | 10 | 15 | 134.7 | 480.1 | 75 | 60.0 |
| | Example 7 | PAI | balance | MoS₂ | 30 | SiO₂ | 10 | 50 | 141.6 | 430.3 | 48 | 60.0 |
| | Example 8 | PAI | balance | MoS₂ | 70 | SiO₂ | 20 | 100 | 252.1 | 452.8 | 80 | 52.5 |
| | Example 9 | PAI | balance | MoS₂ | 50 | SiO₂ | 20 | 10 | 121.9 | 408.1 | 52 | 52.5 |
| | Example 10 | PI | balance | MoS₂ | 20 | SiO₂ | 1 | 100 | 182.1 | 490.8 | 69 | 50.0 |
| | Example 11 | PBI | balance | MoS₂ | 60 | SiO₂ | 1 | 10 | 54.1 | 148.7 | 71 | 50.0 |
| II | Example 12 | PAI | balance | WS₂ | 30 | Si₃N₄ | 15 | 120 | 241.9 | 501.6 | 68 | 47.5 |
| | Example 13 | PI | balance | PTFE | 50 | Ag | 5 | 8 | 49.1 | 219.0 | 49 | 47.5 |
| I | Example 14 | PAI | balance | MoS₂ | 30 | SiO₂ | 0.5 | 50 | 62.1 | 173.6 | 11 | 40.0 |
| | Example 15 | PAI | balance | MoS₂ | 30 | SiO₂ | 25 | 50 | 210.1 | 389.1 | 25 | 37.5 |
| | Comparative Example 1 | PAI | balance | MoS₂ | 30 | SiO₂ | 10 | 15 | — | — | — | 20.5 |

The content of each component (vol. %), the diameter of protecting and reinforcing primary particles, the size of aggregates, and the angle of long axes of aggregates (tilt angle of aggregates) shown in Table 1 were determined by observing the axial-direction cutting surface of each of the resin coating layers 7. More specifically, an image of an arbitrary portion (with a certain area) in the cutting surface was taken, and the obtained image was analyzed with image analysis software (Image-pro plus ver. 4.5) to calculate each of these values.

The following can be seen from the results shown in Table 1.

In each of the resin coating layers 7 of Examples 1 to 15, aggregates 20 of protecting and reinforcing primary particles were dispersed in a resin binder 10, and some of them were exposed at the sliding surface of the resin coating layer 7. In Comparative Example 1, aggregates 20 were not formed.

Example 14 and Example 15 of Group I do not satisfy the requirement "(1) the amount of the protecting and reinforcing primary particles contained in the resin composition is 1 vol. % or more but 20 vol. % or less of the entire resin composition", and therefore the specific loads for seizing thereof are higher than that of Comparative Example 1, but are relatively lower than those of Examples of other groups.

Example 12 and Example 13 of Group II satisfy the requirement "(1) the amount of the protecting and reinforcing primary particles contained in the resin composition is 1 vol. % or more but 20 vol. % or less of the entire resin composition", and therefore the specific loads for seizing thereof are higher than those of Examples of Group I.

Examples 6 to 11 of Group III satisfy the requirement "(1) the amount of the protecting and reinforcing primary particles contained in the resin composition is 1 vol. % or more but 20 vol. % or less of the entire resin composition" and the requirement "(2) the average particle diameter of the protecting and reinforcing primary particles is 10 nm or more but 100 nm or less", and therefore the specific loads for seizing thereof are higher than those of Example 12 and Example 13 of Group II.

Example 5 of Group IV satisfies the above requirements (1) and (2) and the requirement "(3) the size A−1σ of the aggregates is 60 nm or more and the size A+1σ of the aggregates is 400 nm or less", and therefore the specific load for seizing thereof is higher than those of Examples 6 to 11 of Group III.

Examples 1 to 4 of Group V satisfy the above requirements (1) to (3) and the requirement "(4) the aspect ratio of the aggregates is 10 or less", and therefore the specific loads for seizing thereof are higher than that of Example 5 of Group IV.

According to study by the present inventors, one or two or more of the following properties of the resin composition has/have an influence on the seizing resistance of the resin composition.

(1) Aspect Ratio of Aggregates

When aggregates are used as the protecting and reinforcing particles, the aspect ratio of the aggregates is set to 10 or less. The aspect ratio of the aggregates is defined as follows. The aggregates appearing in a measured view in a cutting surface obtained by cutting the sliding resin composition in a direction perpendicular to the sliding surface of the sliding resin composition are approximated by ellipses, and the ratio between the long axis and the short axis of the ellipses is defined as an aspect ratio (long axis/short axis).

When the aspect ratio of the aggregates is 10 or less, in other words, when the shape of the aggregates is closer to a sphere, the area of the aggregates exposed at the sliding surface of the resin composition is stable. A general aggregate is approximated by an ellipse. Therefore, when the aggregates have an aspect ratio of 10 or less, the area of the aggregates appearing in the sliding surface of the resin composition is stable irrespective of the orientation of long axis of the aggregates.

(2) Relationship I between Aggregates and Solid Lubricant

Ten percent or more of the aggregates are closely attached to the solid lubricant or are present in the vicinity of the solid lubricant.

When the aggregates are closely attached to the solid lubricant, the solid lubricant that is first deformed, cleaved, or disintegrated by the application of a load influences the aggregates that are closely attached to the solid lubricant.

For example, when the aggregates are closely attached to the ends of particles of the cleavable solid lubricant so as to cover them, the cleavage of the solid lubricant generates a force that shears the aggregates so that the deformation of the aggregates is induced. That is, the solid lubricant and the aggregates that relax the stress of the resin binder work together so that the solid lubricant having a small threshold stress is first deformed due to an increase in load, and then the aggregates having a relatively large threshold stress are deformed. In this way, stress relaxation follows to load increase without any gap.

Further, also when the aggregates are closely attached to the sides of particles of the solid lubricant, the solid lubricant is first deformed by the application of a load, which influences the resin binder surrounding the solid lubricant so that the resin binder is slightly deformed. That is, a large stress is locally generated in the vicinity of the solid lubricant in the resin binder. At this time, when the aggregates are closely attached to the solid lubricant, the stress locally generated in the resin binder can reliably be relaxed.

As can be seen from the above description, the aggregates may be present in the vicinity of the solid lubricant to relax stress locally generated in the resin composition. In this case, the distance between the solid lubricant and the aggregates is equal to or less than the average particle diameter of the protecting and reinforcing primary particles (10 nm or more but 100 nm or less). When the aggregates are present at such a distance within the above range from the solid lubricant, stress locally generated in the vicinity of the solid lubricant in the resin composition due to the deformation of the solid lubricant can reliably be relaxed.

When 10% or more of the aggregates are closely attached to the solid lubricant or are present in the vicinity of the solid lubricant, deformation of the solid lubricant directly influences the 10% or more of the aggregates. Therefore, even when a load is increased, the solid lubricant and the aggregates work together to continuously relax stress without any gap.

Here, the percentage (%) of the aggregates that are closely attached to the solid lubricant or are present in the vicinity of the solid lubricant is determined in the following manner.

The number of the aggregates that are closely attached to the solid lubricant or are present in the vicinity of the solid lubricant is counted and compared with the total number of the aggregates appearing in a predetermined measured view in a cutting surface obtained by cutting the sliding resin composition in a direction perpendicular to the sliding surface of the sliding resin composition.

(3) Relationship II between Aggregates and Solid Lubricant

The amount of the aggregates to which the ends of two or more particles of the solid lubricant are coupled is 5.0% or more.

When the aggregates are closely attached to the tips of particles of the solid lubricant, the solid lubricant that is first deformed, cleaved, or disintegrated by the application of a load influences the aggregates that are closely attached to the tips of particles of the solid lubricant.

For example, when the aggregates are closely attached to the ends of particles of the cleavable solid lubricant so as to cover them, the cleavage of the solid lubricant generates a force that shears the aggregates so that the deformation of the aggregates is induced. That is, the solid lubricant and the aggregates that relax the stress of the resin binder work together so that the solid lubricant having a small threshold stress is first deformed due to an increase in load, and then the aggregates having a relatively large threshold stress are deformed. In this way, stress relaxation follows to load increase without any gap.

Further, when one aggregate is closely attached to the tips of two or more particles of the solid lubricant to couple them, a force generated by deformation of each of the particles of the solid lubricant is concentrated on the one aggregate, and therefore a force applied to the aggregate due to the deformation of the solid lubricant is increased so that the aggregate is more reliably deformed or disintegrated.

Further, an assembly of two or more particles of the solid lubricant coupled by the aggregate functions as one piece of the solid lubricant because, as described above, the aggregate is easily deformed or disintegrated. In other words, the assembly covers a wider range of the resin binder to relax the stress of the resin binder. This makes it possible to more reliably prevent the disintegration or detachment of the resin binder.

The amount of the aggregates coupling the ends of two or more particles of the solid lubricant is set to 5.0% or more of all the aggregates. When the amount of the aggregates coupling the ends of two or more particles of the solid lubricant is set to 5.0% or more, deformation of two or more particles of the solid lubricant directly influences the aggregates, and therefore the aggregates are more reliably deformed or disintegrated to exert the function of stress relaxation. Therefore, even when a load is increased, the solid lubricant and the aggregates work together to continuously relax stress without any gap.

(4) Relationship III between Aggregates and Solid Lubricant

The average particle diameter of the aggregates is 40% or less of the average particle diameter of the solid lubricant.

When the average particle diameter of the aggregates is 40% or less of the average particle diameter of the solid lubricant, the aggregates are sufficiently smaller than the solid lubricant. This makes it possible to promote the dispersion of the aggregates in the resin composition to ensure the effect of the aggregates on relaxing the stress of the resin binder in the entire resin composition.

(5) Relationship between Particles Constituting Aggregates

The value of D90/D10 of the protecting and reinforcing primary particles constituting the aggregates is set to 5 or less, wherein D10 is a particle diameter when a cumulative height of particle diameters is 10%, and D90 is a particle diameter when a cumulative height of particle diameters is 90%.

Here, a cumulative height of particle diameters refers to an integrated quantity in a particle diameter distribution curve, and D10 refers to a particle diameter when a cumulative percentage reaches 10% from the lower side of the distribution curve, and D90 refers to a particle diameter when a cumulative percentage reaches 90% from the lower side of the distribution curve. Therefore, when the value of D90/D10 is smaller, the particle diameter distribution of the particles is sharper.

When the value of D90/D10 is set to 5 or less, the particles have a sharp particle diameter distribution, that is, have a uniform particle diameter.

The present invention is not limited to the above description of the embodiment according to the present invention. Various modified embodiments are also included in the present invention as long as they are easily conceivable by those skilled in the art and do not depart from the scope of the claims.

The above embodiment has been described with reference to a case where the sliding member is a bearing, but the present invention is applicable also to other sliding members.

REFERENCE SIGNS LIST

1: Sliding member
2: Base material layer
3: Back metal layer
5: Alloy layer
7: Resin coating layer
10: Resin binder
11: Solid lubricant
13: Protecting and reinforcing primary particle
20: Aggregate
30: Recess

The invention claimed is:

1. A sliding resin composition, comprising:
a resin binder;
a solid lubricant; and
a protecting and reinforcing agent comprising aggregates of primary particles, said primary particles being harder than said resin binder and having an average particle diameter of 10 nm or more but 100 nm or less, and said aggregates being more brittle than said resin binder,
wherein said primary particles have a smaller diameter than that of said solid lubricant, and said protecting and reinforcing agent occupies 10-20 vol. % inclusive of the entire sliding resin composition,
wherein, when an average particle diameter of said aggregates is defined as A and a standard deviation of the average particle diameter of said aggregates is defined as σ, A−1σ is 60 nm or more and A+1σ is 400 nm or less, and
wherein the diameter and axes of individual particles and aggregates are determined by use of a particle-equivalent ellipse.

2. A sliding member, comprising a base material layer and a coating layer that is laminated on the base material layer and includes the sliding resin composition according to claim 1, wherein the surface of said coating layer opposite said base material layer is the sliding surface.

3. The sliding member according to claim 2, wherein the average angle between a long axis of said aggregates in said sliding resin composition and the sliding surface is 45 degrees or less.

4. The sliding member according to claim 3, wherein said base material layer has a semi-cylindrical portion.

5. The sliding resin composition according to claim 1, wherein ten percent or more of said aggregates are attached to said solid lubricant or present in the vicinity of said solid lubricant.

6. The sliding resin composition according to claim 1, wherein the average particle diameter of said aggregates is 40% or less of the average particle diameter of said solid lubricant.

7. The sliding member according to claim 3, wherein the average angle between the long axes of the aggregates in said sliding composition and the sliding surface is 22 degrees or less.

8. The sliding resin composition according to claim 1, wherein said aggregates are of smaller diameter than said solid lubricant.

9. The sliding resin composition according to claim 1, wherein the aspect ratio of said aggregate is set to 10 or less.

10. The sliding resin composition according to claim 1, wherein the value of D90/D10 of said primary particles constituting said aggregates is set to 5 or less, wherein D10 is a particle diameter when a cumulative height of particle diameters is 10%, and D90 is a particle diameter when a cumulative height of particle diameters is 90%.

11. The composition of claim 1, wherein said primary particles are formed of silicon dioxide.

12. The sliding resin composition according to claim 1, wherein said solid lubricant occupies 20-70 vol. % inclusive of the entire resin composition.

* * * * *